Patented May 19, 1925.

1,538,618

UNITED STATES PATENT OFFICE.

ROBERT J. BURNSIDE, OF NEW CASTLE, PENNSYLVANIA.

WELDING PROCESS.

No Drawing.   Application filed October 9, 1923.   Serial No. 667,546.

*To all whom it may concern:*

Be it known that I, ROBERT J. BURNSIDE, a citizen of the United States, residing at New Castle, in the county of Lawrence and State of Pennsylvania, have invented certain new and useful Improvements in Welding Processes, of which the following is a specification.

This invention relates to a welding process and more particularly to a process for the welding of copper and brass. It has long been recognized that it is extremely difficult if not impossible to effectually weld copper to copper, brass to brass or copper to brass. I have discovered an extremely simple and inexpensive flux by means of which these metals may be strongly and securely welded to each other. In carrying out the process I heat the copper or brass or copper and brass, as the case may be, to a soft heat and simultaneously dust on as a flux common sugar of any kind, such as brown, soft white, powdered or granulated sugar. My practice of the invention shows that almost any kind of sugar will do the work. The metals are kept in a heated condition until the process is completed and a firm and strong union is secured. The joints may be hammered during the uniting of the metals to any extent deemed advisable by the operator.

I further contemplate adding to the sugar an equal amount of borax, using the sugar and borax in combination as a flux. I have found by experience that this combined flux gives highly desirable results.

Having described my invention, what I claim is:

1. The process of welding copper which consists of subjecting the parts to be welded to the action of heat in the presence of a flux containing sugar.

2. The herein described process of welding copper or brass or copper and brass which consists of subjecting the metal to be welded to the action of a flux consisting essentially of sugar.

3. The herein described process of welding metals of the character described which consists of subjecting said metals to the action of heat in the presence of a flux including sugar and borax.

4. The herein described process of welding metals of the character described which consists of subjecting said metals to the action of heat in the presence of a flux including sugar and borax in substantially equal amounts.

In testimony whereof I hereunto affix my signature.

ROBERT J. BURNSIDE.